United States Patent
Chowdhary et al.

(10) Patent No.: US 11,100,570 B2
(45) Date of Patent: Aug. 24, 2021

(54) PRODUCT CONFIGURATION RECOMMENDATION AND OPTIMIZATION

(71) Applicant: INTERNATIONAL BUSINESS MACHINES CORPORATION, Armonk, NY (US)

(72) Inventors: Pawan Chowdhary, San Jose, CA (US); Markus R. Ettl, Ossining, NY (US); Somnath Mukherjee, Elmsford, NY (US); Zhengliang Xue, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 783 days.

(21) Appl. No.: 15/725,393

(22) Filed: Oct. 5, 2017

(65) Prior Publication Data

US 2019/0108579 A1  Apr. 11, 2019

(51) Int. Cl.
*G06Q 30/06* (2012.01)
*G06Q 30/08* (2012.01)

(52) U.S. Cl.
CPC ......... *G06Q 30/08* (2013.01); *G06Q 30/0611* (2013.01); *G06Q 30/0621* (2013.01); *G06Q 30/0631* (2013.01)

(58) Field of Classification Search
CPC ............... G06Q 30/0611; G06Q 30/08; G06Q 30/0621; G06Q 30/0631

USPC ........................................................ 705/26.3
See application file for complete search history.

(56) References Cited

U.S. PATENT DOCUMENTS

| | | | | |
|---|---|---|---|---|
| 7,908,200 B2* | 3/2011 | Scott | ................... | G06Q 10/0875 705/37 |
| 8,577,745 B2* | 11/2013 | Chatter | .............. | G06Q 30/0601 705/26.3 |
| 8,666,844 B2* | 3/2014 | Shaya | ................ | G06Q 30/0631 705/26.7 |
| 10,032,180 B1* | 7/2018 | Shariff | .................... | G06Q 30/02 |
| 2010/0191580 A1* | 7/2010 | Chatter | .............. | G06Q 30/0241 705/26.3 |
| 2014/0019257 A1* | 1/2014 | Chatter | ................... | G06Q 30/08 705/14.66 |
| 2014/0172621 A1 | 6/2014 | Vittolia | | |
| 2017/0193542 A1* | 7/2017 | Rapaka | .............. | G06Q 30/0625 |
| 2018/0247258 A1* | 8/2018 | Kolb | ....................... | G06Q 10/10 |
| 2018/0247325 A1* | 8/2018 | Melzer | ............... | G06Q 30/0206 |

* cited by examiner

*Primary Examiner* — Alexis M Casey
(74) *Attorney, Agent, or Firm* — Cantor Colburn LLP; Joseph Petrokaitis

(57) ABSTRACT

Systems, methods, and computer-readable media are disclosed for identifying product configurations that are alternatives to a requested product configuration, ranking the alternative product configurations based on one or more pricing metrics, and presenting the alternative product configurations to a prospective customer, thereby providing the customer with the option of selecting an alternative product configuration in lieu of the initially requested product configuration.

14 Claims, 5 Drawing Sheets

PRODUCT CONFIGURATION RECOMMENDATION AND OPTIMIZATION

BACKGROUND

The present invention relates generally to product/service configuration optimization, and more specifically, to identifying and recommending alternatives to a customer requested product configuration that provide more desirable pricing metrics for a seller.

A prospective customer may submit a request for quote (RFQ) for a particular product configuration. The product configuration may be pre-defined by a seller and/or customizable by the customer. The RFQ submitted by the prospective customer may include a requested price for the product configuration. In some instances, the customer's requested price may be too low to yield a profit to the seller for the selected product configuration.

SUMMARY

Embodiments of the invention are directed to a method for identifying an alternative product configuration. A non-limiting example of the method includes receiving, by a computer processor from a client device, a request containing an identification of a product configuration and a requested price for the product configuration. Corresponding sales data such as costs and list prices for all components of the product configuration can also be received. The method further includes identifying, by the computer processor, the alternative product configuration and determining, by the computer processor, pricing metric data for the alternative product configuration, where the pricing metric data comprises an optimized price for the alternative product configuration. The method additionally includes sending, by the computer processor, the pricing metric data for the alternative product configuration to the client device and receiving, by the computer processor from the client device, an indication of selection or rejection of the alternative product configuration.

Embodiments of the invention are directed to a system for identifying an alternative product configuration. A non-limiting example of the system includes at least one memory storing computer-executable instructions and at least one processor configured to access the at least one memory and execute the computer-executable instructions to perform a set of operations. The operations include receiving, from a client device, a request containing an identification of a product configuration and a requested price for the entire product configuration. Corresponding sales data such as costs and list prices for all components of the product configuration can also be received. The set of operations further includes identifying the alternative product configuration and determining pricing metric data for the alternative product configurations, where the pricing metric data comprises an optimized price for the alternative product configuration. The set of operations additionally include sending the pricing metric data for the alternative product configuration to the client device and receiving, from the client device, an indication of selection or rejection of the alternative product configuration.

Embodiments of the invention are directed to a computer program product. A non-limiting example of the computer program product includes a computer readable storage medium having computer readable program instructions embodied therewith, the program instructions executable by a processing circuit to cause the processing circuit to perform a method. A non-limiting example of the method includes receiving, from a client device, a request containing an identification of a product configuration and a requested price for the product configuration. Corresponding sales data such as costs and list prices for all components of the product configuration can also be received. The method further includes identifying the alternative product configuration and determining pricing metric data for the alternative product configuration, where the pricing metric data comprises an optimized price for the alternative product configuration. The method additionally includes sending the pricing metric data for the alternative product configuration to the client device and receiving, from the client device, an indication of selection or rejection of the alternative product configuration.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the invention and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Example embodiments of the invention include, among other things, systems, methods, computer-readable media, techniques, and methodologies for identifying product configurations that are alternatives to a requested product configuration, determining a respective set of pricing metrics for each alternative product configuration, ranking the alternative product configurations based on one or more of the pricing metrics, and presenting the alternative product configurations to a prospective customer, thereby providing the customer with the option of selecting an alternative product configuration in lieu of the initially requested product configuration. A product configuration may include a combination of products and/or services. In certain example embodiments, a product configuration may include a combination of device components, system components, services, or the like that together form a product/service offering. As a non-limiting example, a product configuration may include server components, storage components, software components, accessories, or the like.

The alternative product configurations may be associated with more desirable pricing metrics for a seller than the requested product configuration. For example, an alternative product configuration may be associated with a higher gross profit to the seller than a gross profit associated with the requested product configuration if the requested product configuration is provided at the price requested by the customer. As another non-limiting example, an alternative product configuration may be associated with a higher probability of acceptance (referred to herein as a win probability) than the requested product configuration if the requested product configuration is offered at an optimized price rather than the customer requested price.

Figure 1:
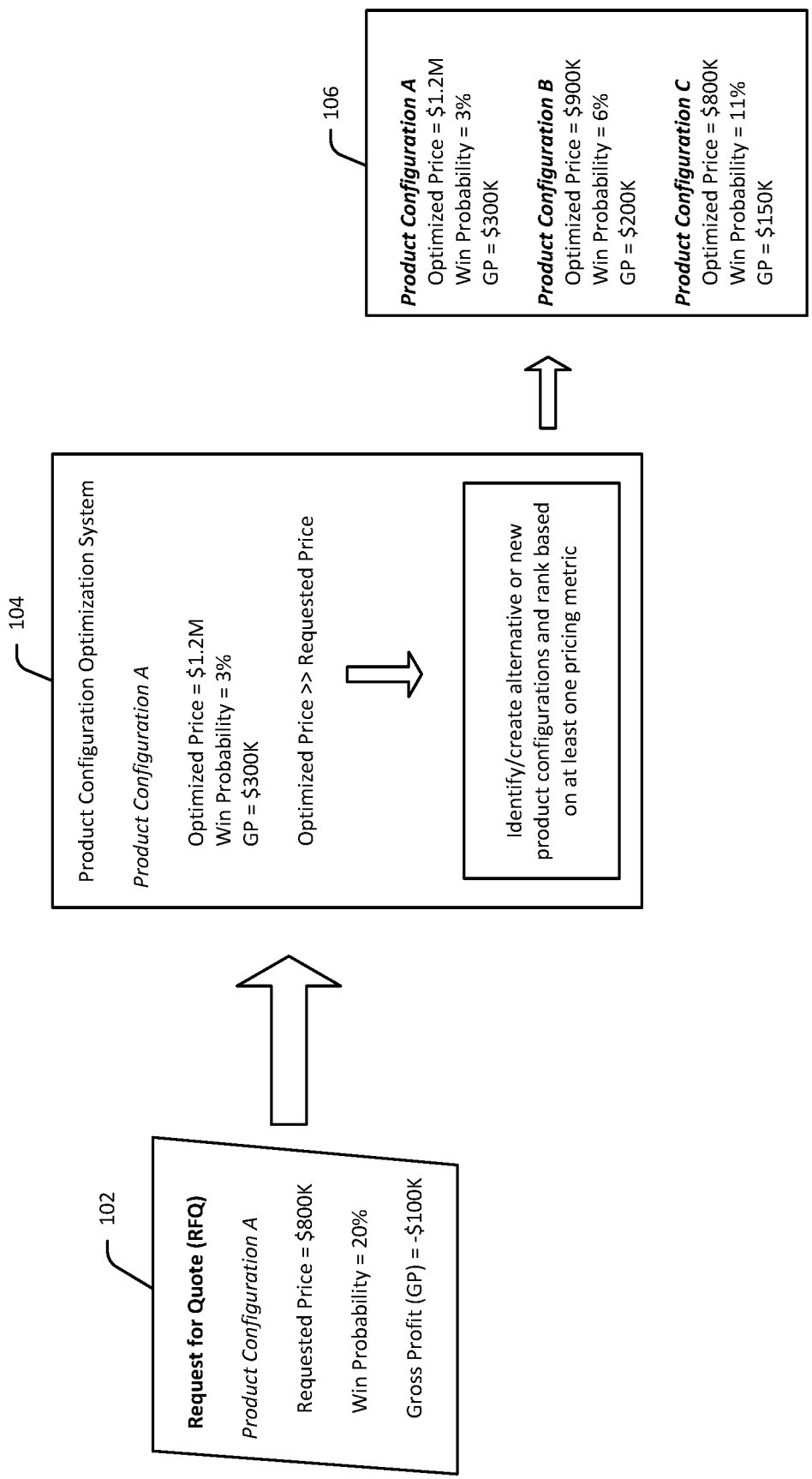
FIG. 1 is a schematic depiction of the identification and ranking of alternative product configurations in accordance with one or more example embodiments of the invention.

FIG. 1 is a schematic depiction of the identification and ranking of alternative product configurations. As shown in FIG. 1, a customer may submit an RFQ 102 that may include an identification of the desired product configuration (product configuration A) and a requested price for product configuration A. A product configuration optimization system 104 may receive the RFQ 102 and parse product configuration A to determine various associated pricing metrics. For example, the product configuration optimization system 104 may determine an optimized price for product configuration A. The product configuration optimization system 104 may further determine a win probability and gross profit for product configuration A if the configuration is offered at the optimized price. The product configuration optimization system 104 may further determine a win probability and a gross profit for product configuration A if offered at the customer requested price.

In the non-limiting example depicted in FIG. 1, the customer requested price for product configuration A is $800,000. At this requested price, the product configuration optimization system 104 determines that the win probability is 20% and the gross profit is −$100,000. The product configuration optimization system 104 further determines an optimized price of $1.2 million for product configuration A as well as a win probability of 3% and a gross profit of $300,000 if the configuration is offered at the optimized price. The product configuration optimization system 104 may then compare the customer requested price of $800,000 for product configuration A to the optimized price of $1.2 million. In certain example embodiments, if the optimized price exceeds the requested price by at least a threshold value, the product configuration optimization system 104 may initiate an algorithmic process to identify and/or create alternative product configurations and rank them based on one or more pricing metrics. The ranked set of alternative product configurations 106 along with associated optimized pricing may then be presented to the customer, thereby allowing the customer to select an alternative product configuration in lieu of the originally requested product configuration.

The win probability and optimized pricing for a product configuration may be based on statistical learning of demand elasticity by grouping historical transactions for similar clients and similar configurations. However, clients' heterogeneity in their requested prices, which may reflect clients' differentiation in budget cap, may not be considered because a seller's pricing model that directly includes the client's requested price as a variable during the learning of demand elasticity and that optimizes the pricing decision based on it may encourage clients to submit intentionally lower requested prices for configurations. To this end, the configuration optimization system disclosed herein in accordance with example embodiments of the disclosure may be configured to recommend more alternative configurations corresponding to a client's requested price (or budget cap) if the requested price deviates significantly from the optimal price of the original configuration (e.g., by at least a threshold value).

In certain example embodiments, the set of alternative product configurations may include the requested product configuration at the optimized price, which is associated with a higher gross profit than the requested price but a lower win probability. The set of alternative product configurations may further include other alternative product configurations that may include a different combination of components than the requested product configuration, but which may be associated with a higher win probability and/or a higher gross profit than the requested product configuration at the requested price. An alternative product configuration may include variations to one or more core components of the requested product configuration. For example, an alternative product configuration may include a set of core components that provide similar but slightly downgraded functionality as compared to a set of core components of the requested product configuration. Moreover, one or more non-essential accessories present in the requested product configuration may be absent from an alternative product configuration.

In this manner, an alternative product configuration—while providing reduced functionality as compared to the requested product configuration—may still provide minimum desired functionality for the customer, and at the same time, a lower cost to the seller than the requested product configuration, and thus, a higher gross profit. In addition, an alternative product configuration may be associated with a higher win probability than the requested product configuration offered at the optimized price because the optimized price of the alternative product configuration—despite potentially being higher than the customer requested price for the requested product configuration—may nonetheless be lower than the optimized price of the requested product configuration. While the win probability of an alternative product configuration may still be lower than the win probability for the requested product configuration at the requested price, the seller's gross profit for the alternative product configuration may be higher, and thus, the optimized pricing for the alternative product configuration would be more desirable to the seller than the customer requested pricing for the customer requested product configuration.

In the example depicted in FIG. 1, three alternative product configurations are identified and presented to the customer. The first alternative product configuration listed is the same product configuration (product configuration A) identified in the RFQ 102 but at the optimized price of $1.2 million (referred to at times herein as alternative product configuration A). While alternative product configuration A is associated with the highest price and the largest gross profit, it is also associated with the lowest win probability. Two additional alternative product configurations are depicted as well. Product configuration B is associated with an optimized price of $900,000, a win probability of 6%, and a gross profit of $300,000. Product configuration C is associated with an optimized price of $800,000, a win probability of 11%, and a gross profit of $150,000. Moving from alternative product configuration A to product configuration B and then to product configuration C, the optimized price decreases and the win probability correspondingly increases. While the first alternative yields the highest gross profit to the seller, it is also associated with the highest optimized price ($1.2 million) and the lowest win probability. In contrast, product configuration B and product configuration C are associated with optimized prices that are closer to (or the same as) the customer requested price for product configuration A and have higher win probabilities than product configuration A at its optimized price but lower gross profits.

Even though product configuration B and product configuration C do not yield as high a gross profit as alternative product configuration A, they still yield a net positive gross profit that is significantly higher than the gross profit to the seller if product configuration A is offered at the customer requested price, and thus, are more desirable to the seller than product configuration A at the customer requested price. The seller is able to offer product configuration B and product configuration C at prices that are closer to (or the same as) the customer requested price for product configuration A because these product configurations contain reduced functionality as compared to product configuration A, and thus, are lower cost. Reduced functionality may result from substitution of a core component with a variant core component that provides similar but reduced functionality, elimination of a component such as an accessory component, or the like. Even though product configurations B and C have reduced functionality compared to product configuration A, the customer may nonetheless find product configuration B or C acceptable if it meets the customer's minimum required functionality because the optimized pricing for these product configurations is close to (or the same as) the requested pricing for product configuration A.

Figure 2:
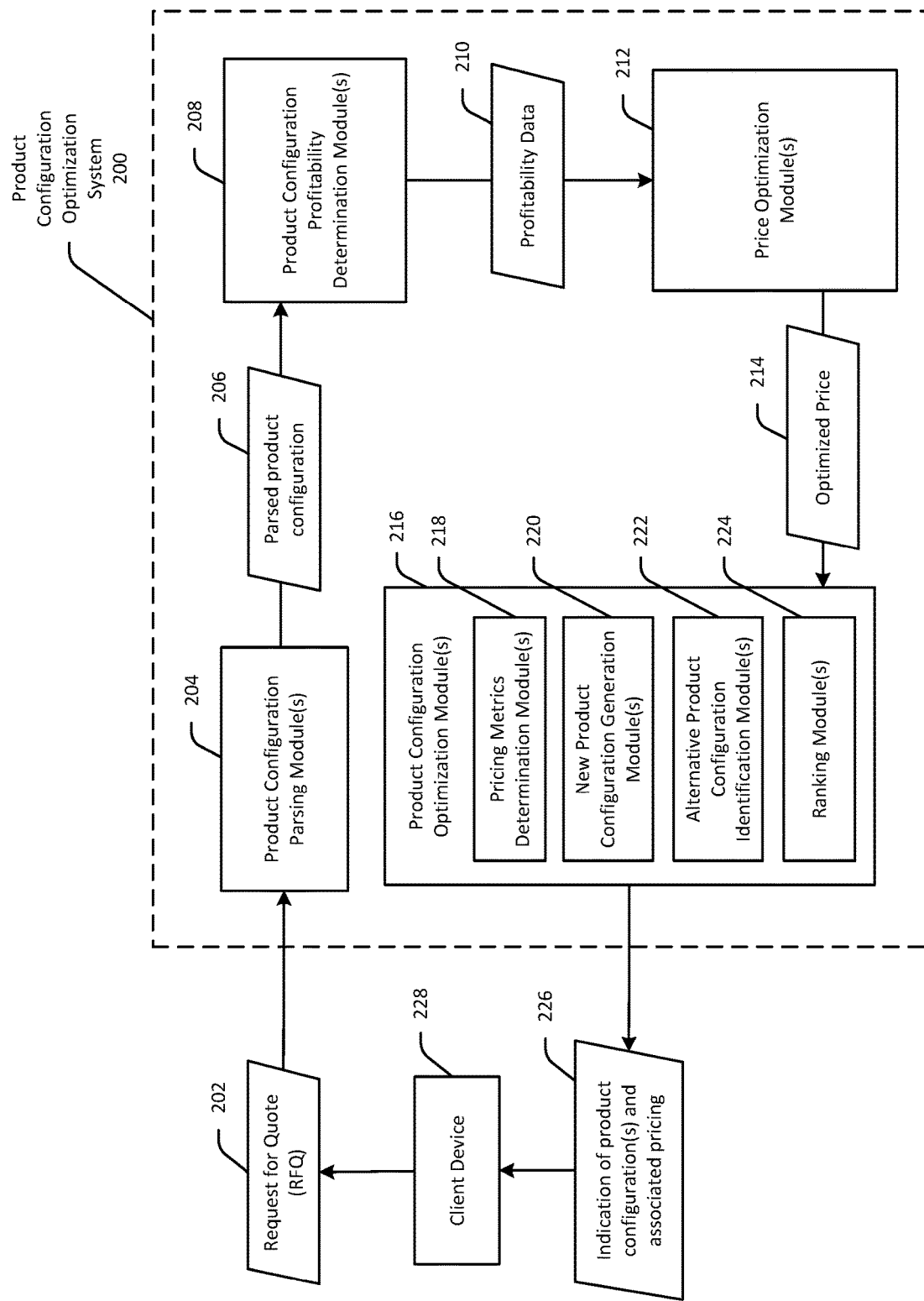
FIG. 2 is a schematic block diagram illustrating various components of a system configured to identify and rank alternative product configurations in accordance with one or more example embodiments of the invention.
Figure 3A:
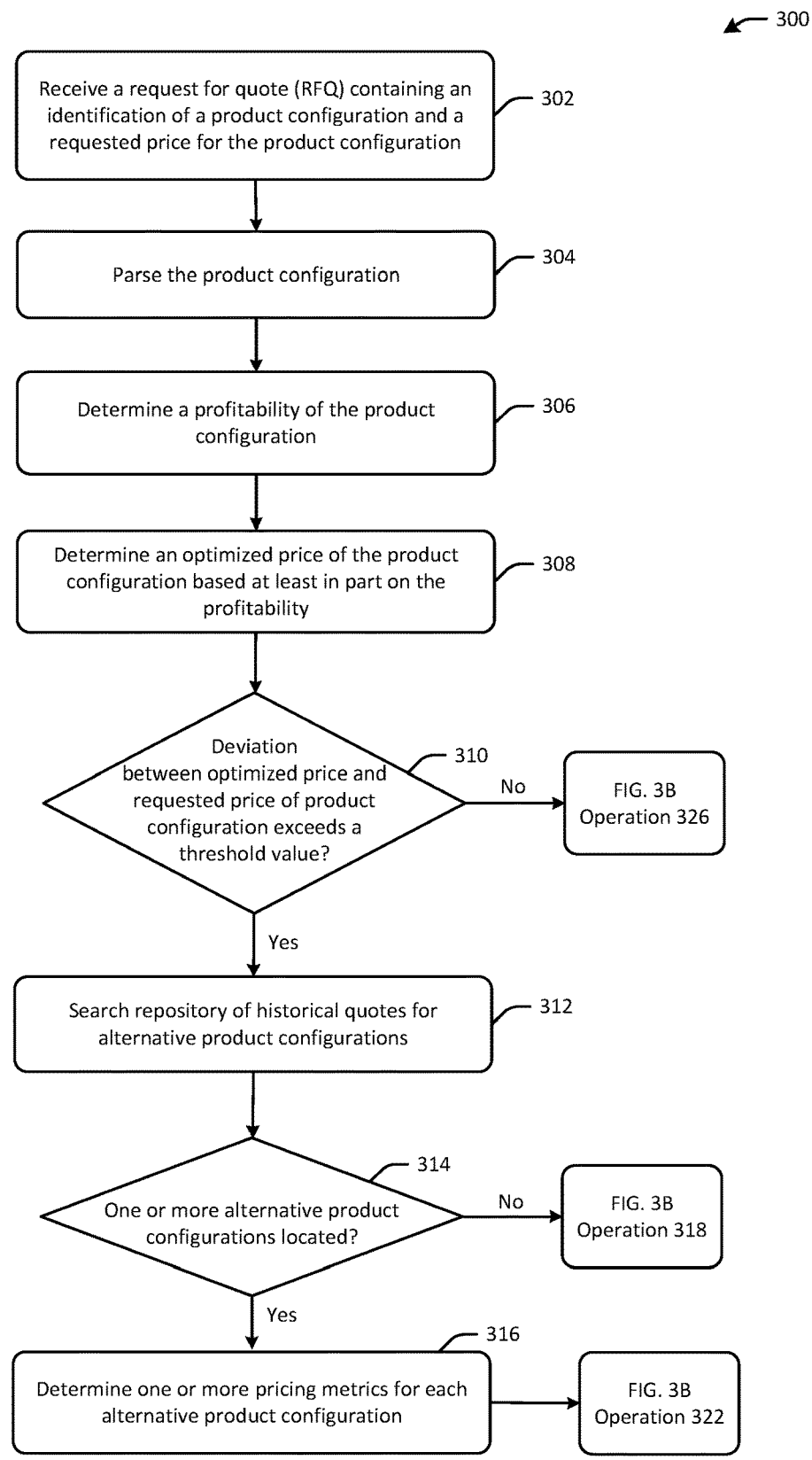
FIG. 3A is a process flow diagram of a method for identifying and ranking alternative product configurations in accordance with one or more example embodiments of the invention.
Figure 3B:
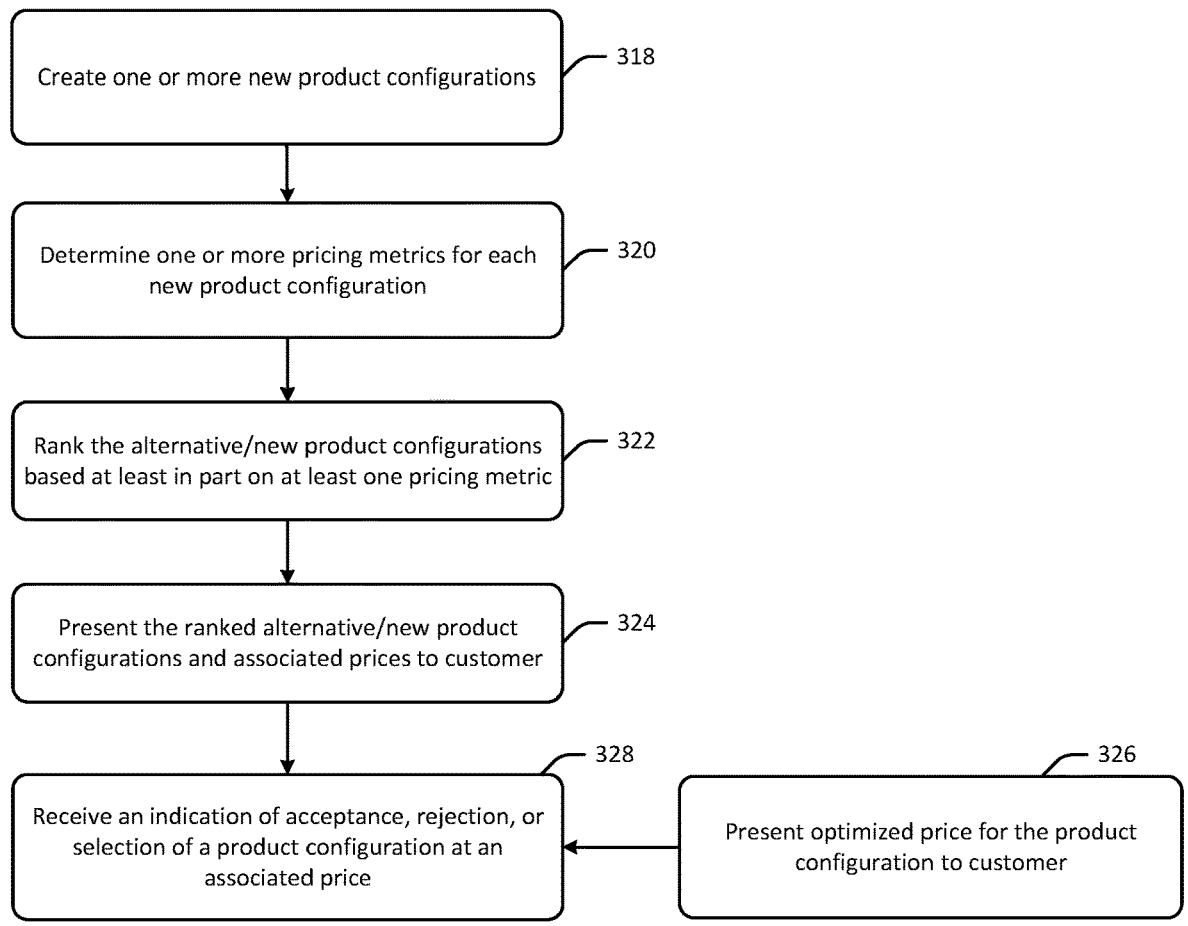
FIG. 3B is a process flow diagram of a method for identifying and ranking alternative product configurations in accordance with one or more example embodiments of the invention.

FIG. 2 is a schematic block diagram illustrating various components of a system configured to identify and rank alternative product configurations. FIGS. 3A-3B are process flow diagrams of a method for identifying and ranking alternative product configurations. FIGS. 2 and 3A-3B will be described in conjunction with one another hereinafter.

One or more operations of the method 300 may be performed by one or more engines, or more specifically, by one or more program modules or sub-modules forming part of such engine(s). An engine, or more specifically, a module contained therein, which may itself contain or be a collection of one or more sub-modules, may include computer-executable instructions that when executed by a processing circuit may cause one or more operations to be performed. A processing circuit may include one or more processing units or nodes. Computer-executable instructions may include computer-executable program code that when executed by a processing unit may cause input data contained in or referenced by the computer-executable program code to be accessed and processed to yield output data. Any engine or module described herein may be implemented in any combination of software, hardware, and/or firmware.

Referring initially to FIGS. 2 and 3A in conjunction with one another, at block 302 of the method 300, a product configuration optimization system 200 configured in accordance with example embodiments of the invention receives an RFQ 202 containing an identification of a product configuration and a requested price for the product configuration. The system 200 may receive the RFQ 202 from, for example, a client device 228. A customer may generate and submit the RFQ 202 via interaction with one or more user interfaces (e.g., a user application) that the client device 228 is configured to render/execute. In certain example embodiments, a customer may utilize the client device 228 to access a server application executing on the system 200 in order to submit the RFQ 202.

In certain example embodiments, the customer may select the desired product configuration from a set of one or more predefined product configurations presented to the customer. In certain example embodiments, the product configuration identified in the RFQ 202 may be a product configuration that is customized by the customer. For example, the customer may select various components (e.g., storage components, hardware components, software packages, etc.) from predetermined options presented to the customer in order to generate the product configuration. In certain example embodiments, the customer may start with a predefined product configuration and customize the product configuration by adding, deleting, or substituting one or more components.

At block 304 of the method 300, computer-executable instructions of one or more product configuration parsing modules 204 forming part of the product configuration optimization system 200 may be executed to parse the product configuration identified in the RFQ 202. Parsing a product configuration may include identifying one or more core components of the product configuration, identifying one or more accessory components, or the like. In certain example embodiments, parsing a product configuration may include determining a hierarchical segmentation for the product configuration.

Determining a hierarchical segmentation for a product configuration may include determining multiple tiers of classification for the product configuration. In certain example embodiments, in a first tier of classification, the product configuration may be classified based on whether the product configuration includes more server components or more storage components. As a non-limiting example, the product configuration may be classified as "entirely server," "mostly server," "entirely storage," or "mostly storage." After determining the first tier classification for the product configuration, the product configuration parsing module(s) 204 may be executed to determine a second tier of classification from the first tier. As a non-limiting example, if the first tier classification of the product configuration is "entirely server," the product configuration may be classified as "mostly hardware" or "mostly software" in the second tier based on the relative allocation of hardware and software components in the product configuration.

The product configuration parsing module(s) 204 may be executed to determine any number of additional classification tiers for the product configuration. For instance, in a third tier of classification, the product configuration parsing module(s) 204 may classify the product configuration in one of multiple bundle grade categories. Each bundle grade category may represent a particular overall valuation of the product configuration. The product configuration may be valued by assigning a respective value to each component of the product configuration and combining the individual component values in any suitable manner—including potentially weighting one or more of the individual component values—to obtain a cumulative valuation of the product configuration. This cumulative valuation may then be used to classify the product configuration as, for example, "high value," "medium value," or "low value," or in accordance with any other classification scheme. The product configuration parsing module(s) 204 may be further executed to classify the product configuration in accordance with other parameters such as a size of the product configuration (e.g., number and total value of components of the product configuration), client-based parameters (e.g., industry of the customer, market capitalization, revenue/sales, etc.), and so forth.

As a result of parsing the product configuration as described earlier, the product configuration parsing module(s) 204 may generate data 206 indicative of the parsed product configuration. The data 206 may include an identification of the various classification tiers into which the product configuration has been classified, an identification of the cumulative value assigned to the product configuration and/or individual values of the components of the product configuration, and so forth.

At block 306 of the method 300, computer-executable instructions of one or more product configuration profitability determination modules 208 forming part of the product configuration optimization system 200 may be executed to receive the parsed product configuration data 206 as input and determine a profitability of the product configuration if offered at the customer requested price. More specifically, the product configuration profitability determination module(s) 208 may utilize the parsed product configuration data 206 to determine a cost of the product configuration and further determine the profitability of the product configuration (e.g., gross profit) based on the determined cost and the customer requested price. The product configuration profitability determination module(s) 208 may generate profitability data 210 indicative of the profitability of the product configuration at the requested price. In certain example embodiments, the profitability data 210 may further include a win probability associated with the product configuration if the product configuration is offered at the requested price.

At block 308 of the method 300, computer-executable instructions of one or more price optimization modules 212 forming part of the product configuration optimization system 200 may be executed to determine an optimized price 214 of the product configuration. In certain example embodiments, the price optimization module(s) 212 may determine the optimized price 214 based at least in part on the profitability determination made at block 306 of the method 300. For instance, the price optimization module(s) 212 may determine the optimized price 214 to be the price at which the product configuration should be offered in order to increase the expected gross profit determined for the product configuration at the requested price to a desired gross profit. In certain example embodiments, the optimized price 214 may yield a desired positive gross profit to the seller, whereas the customer requested price would result in a negative gross profit to the seller. In certain other example embodiments, the optimized price 214 for the product configuration may be determined independently of the profitability determination at block 306 of the method 300. More specifically, in certain example embodiments, the price optimization module(s) 212 may determine the optimized price 214 based on the cumulative valuation of the product configuration, one or more individual valuations of component(s) of the product configuration, a desired gross profit for the product configuration, or the like.

The optimized price 214 determined at block 308 of the method 300 may be provided as input to one or more product configuration optimization modules 216 forming part of the product configuration optimization system 200. The product configuration optimization module(s) 216 may include various sub-modules including, but not limited to, one or more pricing metrics determination modules 218, one or more new product configuration generation modules 220, one or more alternative product configuration identification modules 222, and one or more ranking modules 224. At block 310 of the method 300, computer-executable instructions of the product configuration optimization module(s) 216 may be executed to determine whether the optimized price 214 for the product configuration exceeds the customer requested price for the product configuration by at least a threshold value. The threshold value may be a default value applicable to all product configurations or may be a custom value for the particular product configuration identified in the RFQ 202.

In response to a negative determination at block 310, the method 300 may proceed to block 326 depicted in FIG. 3B. At block 326 of the method 300, computer-executable instructions of the product configuration optimization module(s) 216 may be executed to present the optimized price 214 to the customer who submitted the RFQ 202. More specifically, an indication 226 of the optimized price 214 may be sent to the client device 228, which may then present the information to the customer. Upon presenting the optimized price 214 of the product configuration to the customer, the system 200 may receive, at block 328 of the method 300, an indication of acceptance or rejection of the product configuration at the optimized price 214 from the client device 228.

A negative determination occurs at block 310 if the optimized price 214 does not exceed the customer requested price for the product configuration by the threshold value or more. In such example scenarios, the product configuration optimization module(s) 216 determine that offering the product configuration at the optimized price 214 is an optimized solution rather than presenting alternative product configurations at alternative pricing. In such example scenarios, the optimized price 214 may still be greater than the customer requested price, but does not deviate from the requested price enough to cause the product configuration optimization module(s) 216 to search for or create alternative product configurations. Further, in such example scenarios, the optimized price 214 may be presented to the customer even if the win probability associated with the optimized price 214 is less than the win probability associated with the requested price.

Referring again to FIG. 3A and the determination at block 310 of the method 300, if it is determined that the optimized price 214 for the product configuration identified in the RFQ 202 exceeds the customer requested price by at least the threshold value, the method 300 may proceed to block 312, where computer-executable instructions of the alternative product configuration identification module(s) 222 may be executed to search a data repository of historical RFQs to attempt to locate one or more alternative product configurations. The historical RFQs may include RFQs previously submitted by the same customer and/or different customers. In certain example embodiments, the search may be filtered to only include RFQs submitted by other customers if they are similarly situated with respect to the product configuration and the customer who submitted the RFQ 202 (e.g., in the same industry, the same size, etc.)

In certain example embodiments, a hierarchical clustering tree or other data structure may be generated to determine relationships between the various product configurations associated with the historical RFQs. Relative positions of different product configurations within the hierarchical clustering tree may indicate the degree of similarity between the product configurations. In particular, the more closely two product configurations are located within the tree, the greater their degree of similarity.

In certain example embodiments, the parsed configuration data 206 may be used to determine the position of a product configuration within the hierarchical clustering tree. More specifically, the various classification tiers into which the product configuration has been classified—as indicated by the corresponding parsed configuration data 206—may be used to determine the position of the product configuration in the hierarchical clustering tree. For example, the parsed configuration data 206 for the product configuration may be used to determine the relative allocation of server and storage components in the product configuration, and may be further used to determine the relative allocation between hardware, software, and/or service components. In addition, various brands associated with components of the product configuration may be determined. Physical performance measures such as speed, volume, etc. of components may also be determined. Respective weights may be applied to one or components in the product configuration based on the type of component (e.g., server, storage, hardware, software, service, etc.), the brand of the component, the physical performance characteristics of the component, or the like. These individual weights may be combined in accordance with any suitable formula to arrive at a composite score for the product configuration. This composite score may be used to determine the position of the product configuration in the hierarchical clustering tree.

In certain example embodiments, while performing the search of the data repository of historical RFQs, which may include traversing a hierarchical clustering tree as noted above, the alternative product configuration identification module(s) 222 may restrict the search to those alternative product configurations that satisfy the customer's budget constraint. For example, the search may be restricted to only those alternative product configurations whose optimized price is at or below the customer requested price for the customer requested configuration.

At block 314 of the method 300, computer-executable instructions of the alternative product configuration identification module(s) 222 may be executed to determine whether one or more alternative product configurations have been located based on the search performed at block 312. In response to a positive determination at block 314 of the method 300, one or more pricing metrics determination modules 218 may be executed to determine a respective set of one or more pricing metrics for each alternative product configuration that is identified. The pricing metrics may include any suitable metric including, without limitation, an optimized price of an alternative product configuration, a win probability associated with the alternative product configuration, a gross profit for the alternative product configuration at the optimized price, and so forth.

In response to a negative determination at block 314 of the method 300, indicating that no alternative product configurations were located in the search performed at block 312, the method 300 may proceed to block 318 depicted in FIG. 3B where computer-executable instructions of one or more new product configuration generation modules 220 may be executed to create one or more new product configurations.

The original product configuration identified in the RFQ 202 may serve as a basis for the generation of new product configurations. More specifically, the new product configuration generation module(s) 220 may be executed to identify, from the parsed product configuration data 206, each core component of the product configuration identified in the RFQ 202. The new product configuration generation module(s) 220 may be further executed to determine strong association rules between the core components and component types, component categories, and/or component brands. For example, if the parsed product configuration data 206 indicates that a storage area network (SAN) has been specified as the type of storage in the product configuration, then the SAN component category may be deemed strongly associated with the storage component type, whereas the tape component category, for example, may be deemed weakly associated with the storage component type. As another non-limiting example, if the parsed configuration data 206 indicates that a particular server brand has been included in the product configuration, then the new product configuration generation module(s) 220 may generate a rule that strongly associates that server brand with the server component type. It should be appreciated that the above examples of types of components and association rules are merely illustrative and not exhaustive.

The new product configuration generation module(s) 220 may utilize both the identification of the core components of the original product configuration and the association rules to generate the new product configuration. For example, various storage components may be offered together in various bundles. The new product configuration generation module(s) 220 may be executed to identify each storage bundle that includes the storage component category (e.g., SAN) that has been determined to be strongly associated with the storage component type. Among the various bundles that may include the SAN component category, a bundle that is less costly (e.g., includes cheaper storage components) may be selected for inclusion in a new product configuration. The new product configuration generation module(s) 220 may continue to build a new product configuration by identifying component bundles that satisfy association rules associated with the original product configuration and selecting cheaper alternative bundles among the identified bundles that still include identified core components of the original product configuration.

The new product configuration generation module(s) 220 may be further executed to identify core component-accessory pairs in the original product configuration and to determine, for each such pairing, whether the core component is strongly or weakly associated with the corresponding accessory. As part of generating a new product configuration, the new product configuration generation module(s) 220 may be executed to retain core component-accessory pairs that are determined to be strongly associated and either eliminate or replace with cheaper alternatives those accessories that are determined to be only weakly associated with core components. If a core component that is strongly associated with an accessory is replaced with a similar but cheaper alternative core component, the same accessory may be included in the new product configuration. Alternatively, if the same accessory cannot be used with the alternative core component (e.g., is not compatible), an alternative accessory may be included.

Upon creating the one or more new product configurations, computer-executable instructions of the pricing metrics determination module(s) 218 may be executed to determine a respective set of one or more pricing metrics for each new product configuration. The pricing metrics may include any of those previously described. At block 322 of the method 300, computer-executable instructions of the ranking module(s) 224 may be executed to rank the set of new product configurations with respect to at least one pricing metric. For example, the new product configurations may be ranked in accordance with their win probabilities, their optimized prices, or their associated gross profits. The method 300 may also proceed from block 316 to block 322 where computer-executable instructions of the ranking module(s) 224 may be executed to rank the alternative product configurations identified during the search with respect to at least one pricing metric. In certain example embodiments, both alternative product configurations and new product configurations may be identified and generated, respectively. In such example embodiments, the alternative and new product configurations may be ranked together or separately.

At block 324 of the method 300, the system 200 may send an indication 226 of the ranked alternative/new product configurations and associated optimized pricing to the client device 228 for presentation to the customer via the client device 228. At block 328, the system 200 may receive an indication of acceptance, rejection, or selection of a product configuration at an associated optimized price. For example, the customer may accept or reject the originally requested product configuration at the optimized price. Alternatively, in those example embodiments in which alternative or new product configurations are presented as options to the customer, the customer may select a product configuration at an associated optimized price or reject all of the options that are presented. In certain example embodiments, the customer may be provided with the capability to customize an alternative/new product configuration to add, eliminate, or replace one or more components and suggest pricing different from the optimized price for the alternative/new product configuration.

Example embodiments of the invention include or yield various technical features, technical effects, and/or improvements to technology. For instance, example embodiments of the invention provide the technical effect of optimizing product configuration components and pricing metrics to improve profitability to the seller of the product configuration while still ensuring the buyer receives minimum desired functionality. This technical effect is achieved as a result of the technical features of triggering a product optimization process when a customer requested price for a product configuration deviates from an optimized price by at least a threshold value, and executing the optimization process to identify and/or create alternative or new product configurations that retain minimum desired functionality for the buyer, and at the same time, provide more desirable pricing metrics to the seller. The above-described technical features and their associated technical effect yield an improvement to conventional computer-based technologies for product configuration optimization. It should be appreciated that the above examples of technical features, technical effects, and improvements to technology provided by example embodiments of the invention are merely illustrative and not exhaustive.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this disclosure.

Figure 4:
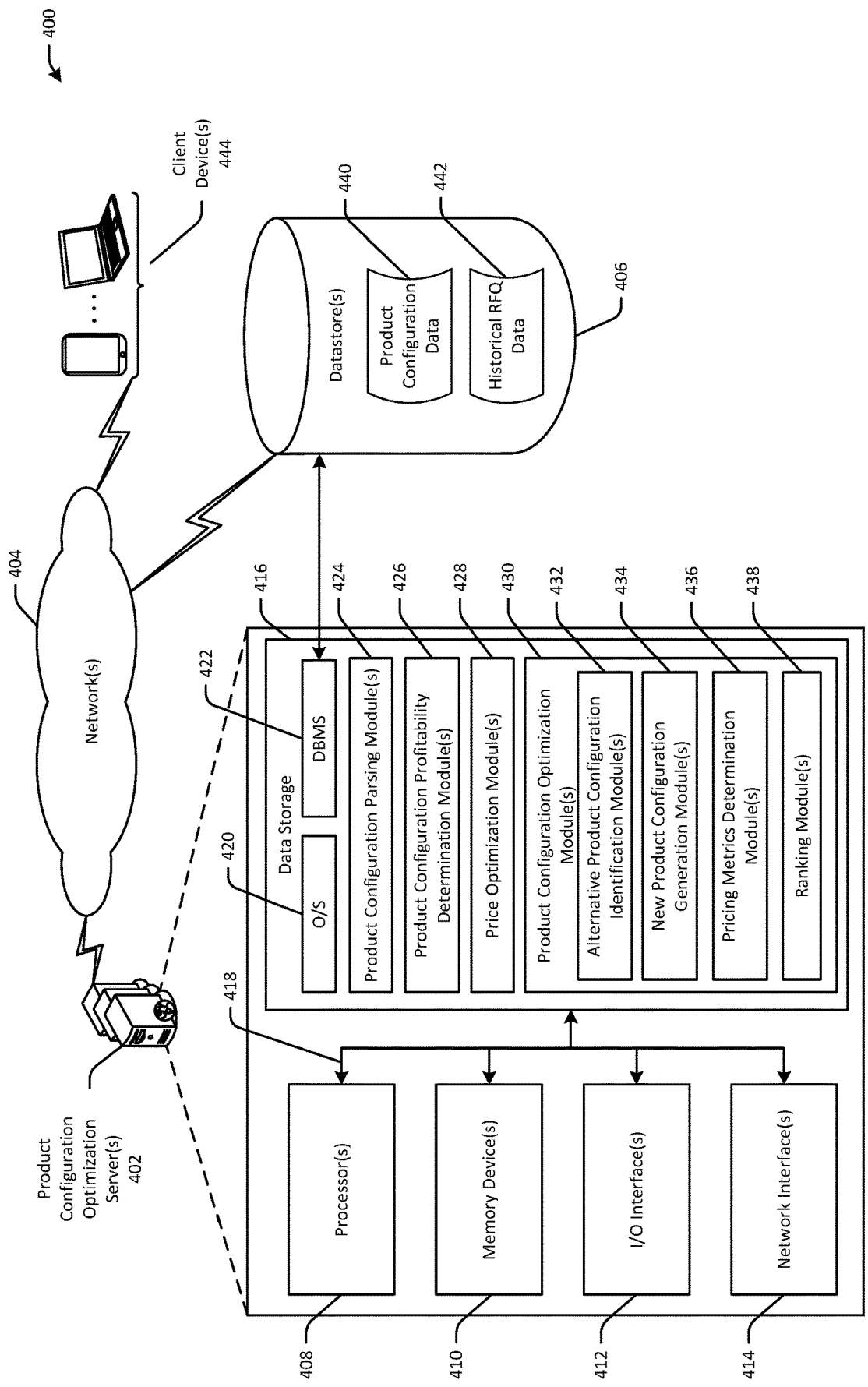
FIG. 4 is a schematic diagram of an illustrative networked architecture in accordance with one or more example embodiments of the invention.

FIG. 4 is a schematic diagram of an illustrative networked architecture 400 in accordance with one or more example embodiments of the invention in accordance with one or more example embodiments of the disclosure. The networked architecture 400 may include one or more product configuration optimization servers 402. The server(s) 402 may represent, at least in part, the system 200 depicted in FIG. 2, in an illustrative configuration. The server(s) 402 may be configured to communicate with one or more client devices 444 and/or access one or more data stores 406 over one or more network(s) 404. While not depicted in FIG. 4, the server(s) 402 may also be configured to communicate with one or more other systems and/or devices via the network(s) 404. While the server(s) 402 may be described in the singular hereinafter for ease of explanation, it should be appreciated that multiple servers 402 may be provided and functionality described herein may be distributed across such multiple servers 402 in a distributed fashion.

The network(s) 404 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 404 may have any suitable communication range associated therewith and may include, for example, global networks (e.g., the Internet), metropolitan area networks (MANs), wide area networks (WANs), local area networks (LANs), or personal area networks (PANs). In addition, the network(s) 404 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 402 may include one or more processors (processor(s)) 408, one or more memory devices 410 (generically referred to herein as memory 410), one or more input/output ("I/O") interface(s) 412, one or more network interfaces 414, and data storage 416. The server 402 may further include one or more buses 418 that functionally couple various components of the server 402.

The bus(es) 418 may include at least one of a system bus, a memory bus, an address bus, or a message bus, and may permit exchange of information (e.g., data (including computer-executable code), signaling, etc.) between various components of the server 402. The bus(es) 418 may include, without limitation, a memory bus or a memory controller, a peripheral bus, an accelerated graphics port, and so forth. The bus(es) 418 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 410 of the server 402 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 410 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 410 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 416 may include removable storage and/or non-removable storage including, but not limited to, magnetic storage, optical disk storage, and/or tape storage. The data storage 416 may provide non-volatile storage of computer-executable instructions and other data. The memory 410 and the data storage 416, removable and/or non-removable, are examples of computer-readable storage media (CRSM) as that term is used herein.

The data storage 416 may store computer-executable code, instructions, or the like that may be loadable into the memory 410 and executable by the processor(s) 408 to cause the processor(s) 408 to perform or initiate various operations. The data storage 416 may additionally store data that may be copied to memory 410 for use by the processor(s) 408 during the execution of the computer-executable instructions. Moreover, output data generated as a result of execution of the computer-executable instructions by the processor(s) 408 may be stored initially in memory 410 and may ultimately be copied to data storage 416 for non-volatile storage.

More specifically, the data storage 416 may store one or more operating systems (O/S) 420; one or more database management systems (DBMS) 422 configured to access the memory 410 and/or one or more of the data stores 406; and one or more program modules, applications, engines, computer-executable code, scripts, or the like such as, for example, one or more product configuration parsing modules 424, one or more product configuration profitability determination modules 426, one or more price optimization modules 428, and one or more product configuration optimization modules 430. Any of the aforementioned modules may include one or more sub-modules. For example, the product configuration optimization module(s) 430 may include, without limitation, one or more alternative product configuration identification module(s) 432, one or more new product configuration generation module(s) 434, one or more pricing metrics determination module(s) 436, and one or more ranking module(s) 438. Any of the components depicted as being stored in data storage 416 may include any combination of software, firmware, and/or hardware. The software and/or firmware may include computer-executable instructions (e.g., computer-executable program code) that may be loaded into the memory 410 for execution by one or more of the processor(s) 408 to perform any of the operations described earlier in this disclosure in connection with correspondingly named modules.

Although not depicted in FIG. 4, the data storage 416 may further store various types of data utilized by components of the server 402 (e.g., any of the data depicted in FIG. 4 as being stored in the datastore(s) 406). Any data stored in the data storage 416 may be loaded into the memory 410 for use by the processor(s) 408 in executing computer-executable instructions. In addition, any data stored in the data storage 416 may potentially be stored in the datastores 406 and may be accessed via the DBMS 422 and loaded in the memory 410 for use by the processor(s) 408 in executing computer-executable instructions.

The processor(s) 408 may be configured to access the memory 410 and execute computer-executable instructions loaded therein. For example, the processor(s) 408 may be configured to execute computer-executable instructions of the various program modules, applications, engines, or the like of the server 402 to cause or facilitate various operations to be performed in accordance with one or more embodiments of the disclosure. The processor(s) 408 may include any suitable processing unit capable of accepting data as input, processing the input data in accordance with stored computer-executable instructions, and generating output data. The processor(s) 408 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 408 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 408 may be capable of supporting any of a variety of instruction sets.

Referring now to other illustrative components depicted as being stored in the data storage 416, the O/S 420 may be loaded from the data storage 416 into the memory 410 and may provide an interface between other application software executing on the server 402 and hardware resources of the server 402. More specifically, the O/S 420 may include a set of computer-executable instructions for managing hardware resources of the server 402 and for providing common services to other application programs (e.g., managing memory allocation among various application programs). In certain example embodiments, the O/S 420 may control execution of one or more of the program modules depicted as being stored in the data storage 416. The O/S 420 may include any operating system now known or which may be developed in the future including, but not limited to, any server operating system, any mainframe operating system, or any other proprietary or non-proprietary operating system.

The DBMS 422 may be loaded into the memory 410 and may support functionality for accessing, retrieving, storing, and/or manipulating data stored in the memory 410, data stored in the data storage 416, and/or data stored in the data store(s) 406. The DBMS 422 may use any of a variety of database models (e.g., relational model, object model, etc.) and may support any of a variety of query languages. The DBMS 422 may access data represented in one or more data schemas and stored in any suitable data repository. The data store(s) 406 may store, for example, product configuration data 440 and historical RFQ data 442. The product configuration data 440 may include, without limitation, parsed configuration data for a product configuration identified in a current RFQ; parsed configuration data for an alternative/new product configuration; pricing metrics data for the product configuration identified in the RFQ; pricing metrics data for an alternative/new product configuration; or the like. The historical RFQ data 442 may include, without limitation, any type of data associated with historical RFQs including any of the types of data previously described. The data store(s) 406 that may be accessible by the server 402 via the DBMS 422 may include, but are not limited to, databases (e.g., relational, object-oriented, etc.), file systems, flat files, distributed datastores in which data is stored on more than one node of a computer network, peer-to-peer network datastores, or the like. The data store(s) 406 may store various types of data including, without limitation, any of the types of data previously described. It should be appreciated that, in certain example embodiments, any external data store and/or any of the data residing thereon may additionally, or alternatively, be stored locally in the data storage 416.

Referring now to other illustrative components of the server 402, the input/output (I/O) interface(s) 412 may facilitate the receipt of input information by the server 402 from one or more I/O devices as well as the output of information from the server 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 402 or may be separate. The I/O devices may further include, for example, any number of peripheral devices such as data storage devices, printing devices, and so forth.

The I/O interface(s) 412 may also include an interface for an external peripheral device connection such as universal serial bus (USB), FireWire, Thunderbolt, Ethernet port or other connection protocol that may connect to one or more networks. The I/O interface(s) 412 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The server 402 may further include one or more network interfaces 414 via which the server 402 may communicate with other platforms, networks, devices, data stores (e.g., data store(s) 406), and so forth. The network interface(s) 414 may enable communication, for example, via one or more of the network(s) 404.

It should be appreciated that the program modules depicted in FIG. 4 as being stored in the data storage 416 are merely illustrative and not exhaustive and that processing described as being supported by any particular program module may alternatively be distributed across multiple program modules or performed by a different program module. In addition, various program module(s), script(s), plug-in(s), Application Programming Interface(s) (API(s)), or any other suitable computer-executable code hosted locally on the server 402 and/or hosted on other computing device(s) accessible via one or more of the network(s) 404, may be provided to support functionality provided by the program modules depicted in FIG. 4 and/or additional or alternate functionality. Further, functionality may be modularized differently such that processing described as being supported collectively by a collection of program modules depicted in FIG. 4 may be performed by a fewer or greater number of program modules, or functionality described as being supported by any particular program module may be supported, at least in part, by another program module. In addition, program modules that support the functionality described herein may form part of one or more applications executable across any number of servers 402 and/or client devices 444 in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the server 402 may include alternate and/or additional hardware, software, or firmware components beyond those described or depicted without departing from the scope of the disclosure. More particularly, it should be appreciated that software, firmware, or hardware components depicted as forming part of the server 402 are merely illustrative and that some components may not be present or additional components may be provided in various embodiments. While various illustrative program modules have been depicted and described as software modules stored in data storage 416, it should be appreciated that functionality described as being supported by the program modules may be enabled by any combination of hardware, software, and/or firmware. It should further be appreciated that each of the above-mentioned program modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular program module may, in various embodiments, be provided at least in part by one or more other program modules. Further, one or more depicted program modules may not be present in certain embodiments, while in other embodiments, additional program modules or modules not depicted may be present and may support at least a portion of the described functionality and/or additional functionality.

One or more operations of the method 300 may be performed by a server 402 having the illustrative configuration depicted in FIG. 4, or more specifically, by one or more program modules, engines, applications, or the like executable on such a device. It should be appreciated, however, that such operations may be implemented in connection with numerous other device configurations. For example, the operations of the method 300 may be performed in a distributed fashion by a server 402 and a client device 444.

The operations described and depicted in the illustrative method 300 of FIG. 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the invention have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for identifying an alternative product configuration, the method comprising:
   receiving, by a computer processor from a client device, a request comprising an identification of a product configuration and a requested price for the product configuration;
   obtaining, from a data repository, historical requests for quotes comprising a plurality historical product configurations and historical requested prices associated with each of the plurality of historical product configurations;
   generating a clustering tree for the plurality of historical product configurations, wherein relative positions of the product configurations within the clustering tree indicate a degree of similarity between the plurality of product configurations;
   identifying, by the computer processor, a first alternative product configuration based on:
      determining one or more characteristics of the product configuration by parsing one or more components included in the product configuration;
      searching the clustering tree for the first alternative product configuration in the plurality of historical product configurations, wherein a relative position of the first alternative product configuration is within a threshold distance to a relative position of the product configuration in the clustering tree;
   determining, by the computer processor, pricing metric data for the alternative product configuration, wherein the pricing metric data comprises proposed price for the first alternative product configuration;
   identifying, by the computer processor, one or more additional alternative product configurations based on determining that the proposed price for the first alternative product configuration exceeds the requested price for the product configuration by a threshold value;
   determining additional pricing metric data for the one or more additional alternative product configurations;
   sending, by the computer processor, the pricing metric data for the first alternative product configuration and the additional pricing metric data for the one or more additional alternative product configurations to the client device; and
   receiving, by the computer processor from the client device, an indication of selection or rejection of the alternative product configuration and the one or more additional alternative product configurations.

2. The computer-implemented method of claim 1, wherein the proposed price of the first alternative product configuration is greater or equal to the requested price for the product configuration and less than a proposed price for the product configuration.

3. The computer-implemented method of claim 1, wherein determining the pricing metric data further comprises determining a first win probability and a first profit associated with the alternative product configuration.

4. The computer-implemented method of claim 3, comprising:
   determining, by the computer processor, a second win probability associated with the product configuration;
   determining, by the computer processor, a second profit associated with the product configuration;
   determining, by the computer processor, that at least one of: i) the first win probability exceeds the second win probability or ii) the first profit exceeds the second profit; and
   determining, by the computer processor, that the alternative product configuration should be offered in lieu of the product configuration based at least in part on determining that at least one of: i) the first win probability exceeds the second win probability or ii) the first profit exceeds the second profit.

5. The computer-implemented method of claim 1, wherein the alternative product configuration comprises one or more components that provide reduced functionality compared to one or more corresponding components of the product configuration.

6. A system for identifying an alternative product configuration, the system comprising:
   at least one memory storing computer-executable instructions; and
   at least one processor configured to access the at least one memory and execute the computer-executable instructions to:
      receive, from a client device, a request comprising an identification of a product configuration and a requested price for the product configuration;
      obtain, from a data repository, historical requests for quotes comprising a plurality historical product configurations and historical requested prices associated with each of the plurality of historical product configurations;
      generate a clustering tree for the plurality of historical product configurations, wherein relative positions of the product configurations within the clustering tree indicate a degree of similarity between the plurality of product configurations;
      identify a first alternative product configuration based on:
         determining one or more characteristics of the product configuration by parsing one or more components included in the product configuration;
         searching the clustering tree for the first alternative product configuration in the plurality of historical product configurations, wherein a relative position of the first alternative product configuration is within a threshold distance to a relative position of the product configuration in the clustering tree;
      determine pricing metric data for the alternative product configuration, wherein the pricing metric data comprises a proposed price for the first alternative product configuration;
      identify one or more additional alternative product configurations based on determining that the proposed price for the first alternative product configuration exceeds the requested price for the product configuration by a threshold value;

determine additional pricing metric data for the one or more additional alternative product configurations;

send the pricing metric data for the first alternative product configuration and the additional pricing metric data for the one or more additional alternative product configurations to the client device; and receive, from the client device, an indication of selection or rejection of the alternative product configuration and the one or more additional alternative product configurations.

7. The system of claim 6, wherein the proposed price of the first alternative product configuration is greater than or equal to the requested price for the product configuration and less than a proposed price for the product configuration.

8. The system of claim 6, wherein determining the pricing metric data further comprises determining a first win probability and a first profit associated with the alternative product configuration.

9. The system of claim 8, wherein the at least one processor is further configured to execute the computer-executable instructions to:

determine a second win probability associated with the product configuration;

determine a second profit associated with the product configuration;

determine that at least one of: i) the first win probability exceeds the second win probability or ii) the first profit exceeds the second profit; and determine that the alternative product configuration should be offered in lieu of the product configuration based at least in part on determining that at least one of: i) the first win probability exceeds the second win probability or ii) the first profit exceeds the second profit.

10. The system of claim 6, wherein the alternative product configuration comprises one or more components that provide reduced functionality compared to one or more corresponding components of the product configuration.

11. A computer program product for identifying an alternative product configuration, the computer program product comprising a computer readable storage medium having program instructions embodied therewith, the program instructions executable by a processing circuit to cause the processing circuit to perform a method comprising:

receiving, from a client device, a request comprising an identification of a product configuration and a requested price for the product configuration;

obtaining, from a data repository, historical requests for quotes comprising a plurality historical product configurations and historical requested prices associated with each of the plurality of historical product configurations;

generating a clustering tree for the plurality of historical product configurations, wherein relative positions of the product configurations within the clustering tree indicate a degree of similarity between the plurality of product configurations;

identifying a first alternative product configuration based on:

determining one or more characteristics of the product configuration by parsing one or more components included in the product configuration;

searching the clustering tree for the first alternative product configuration in the plurality of historical product configurations, wherein a relative position of the first alternative product configuration is within a threshold distance to a relative position of the product configuration in the clustering tree;

determining pricing metric data for the alternative product configuration, wherein the pricing metric data comprises a proposed price for the first alternative product configuration;

identifying, by the computer processor, one or more additional alternative product configurations based on determining that the proposed price for the first alternative product configuration exceeds the requested price for the product configuration by a threshold value;

determining additional pricing metric data for the one or more additional alternative product configurations;

sending the pricing metric data for the alternative product configuration and the additional pricing metric data for the one or more additional alternative product configurations to the client device; and receiving, from the client device, an indication of selection or rejection of the alternative product configuration and the one or more additional alternative product configurations.

12. The computer program product of claim 11, wherein the proposed price of the first alternative product configuration is greater than or equal to the requested price for the product configuration and less than a proposed price for the product configuration.

13. The computer program product of claim 11, wherein determining the pricing metric data further comprises determining a first win probability and a first profit associated with the alternative product configuration.

14. The computer program product of claim 13, further comprising:

determining a second win probability associated with the product configuration;

determining a second profit associated with the product configuration;

determining that at least one of: i) the first win probability exceeds the second win probability or ii) the first profit exceeds the second profit; and determining that the alternative product configuration should be offered in lieu of the product configuration based at least in part on determining that at least one of: i) the first win probability exceeds the second win probability or ii) the first profit exceeds the second profit.

* * * * *